United States Patent [19]

Eiffler et al.

[11] Patent Number: 5,356,937
[45] Date of Patent: Oct. 18, 1994

[54] RESINS AND PROCESSES FOR PREPARING THEM

[75] Inventors: Jürgen Eiffler; Hans-Peter Schneider, both of Stade, Fed. Rep. of Germany

[73] Assignee: The Dow Chemical Company, Midland, Mich.

[21] Appl. No.: 932,156

[22] Filed: Aug. 19, 1992

Related U.S. Application Data

[62] Division of Ser. No. 293,787, Jan. 5, 1989, abandoned.

[51] Int. Cl.$^5$ .............................. C08F 8/00; B01J 39/00
[52] U.S. Cl. ........................................ 521/33; 521/31
[58] Field of Search ........................... 521/32, 33, 31; 525/344, 383

[56] References Cited

U.S. PATENT DOCUMENTS

| | | | |
|---|---|---|---|
| 3,037,945 | 6/1962 | Morris . | |
| 3,882,053 | 6/1975 | Corte et al. . | |
| 3,989,650 | 11/1976 | Lange et al. . | |
| 4,002,564 | 1/1977 | Carbonel et al. . | |
| 4,111,859 | 9/1978 | Strop et al. | 521/33 |
| 4,182,804 | 1/1980 | Serboli et al. | 521/32 |
| 4,360,434 | 11/1982 | Kawayushi et al. | 521/32 |
| 4,442,231 | 4/1984 | Kataoka et al. . | |
| 4,777,219 | 10/1988 | Long | 525/344 |
| 4,952,642 | 8/1990 | Long | 525/344 |

FOREIGN PATENT DOCUMENTS

| | | |
|---|---|---|
| 87934 | 4/1976 | European Pat. Off. . |
| 101943 | 3/1984 | European Pat. Off. . |
| 1695449 | 4/1971 | Fed. Rep. of Germany . |
| 1132116 | of 1965 | United Kingdom . |
| 8302947 | 9/1983 | World Int. Prop. O. . |
| 8603988 | 7/1986 | World Int. Prop. O. . |

OTHER PUBLICATIONS

Trans. of U.S.S.R. Inventor's Certificate 385,977.
"Ion Exchange", F. Helfferich, McGraw-Hill Book Co., N.Y. 1962.
"Ullmann's Enzyklpädie der Technischen Chemie", 4th Edition, vol. 13, pp. 279 et seq.
"Sulphonation and related reactions", E. E. Gilbert, Interscience Publisher, 1965, pp. 242 et seq.

*Primary Examiner*—Thurman K. Page
*Assistant Examiner*—Peter F. Kulkosky

[57] ABSTRACT

The resin has a polymeric matrix and functional groups of formula I wherein the radicals have the meaning stated in claim 1. The resin is prepared by reacting a corresponding resin having functional groups of formula II with $HC(O)R^2$ and $(R^3)_2SO_3$ or $(R^3)_2S_2O_5$. The resin is useful for reducing the concentration of alkaline earth or transition metal ions in a solution.

19 Claims, No Drawings

RESINS AND PROCESSES FOR PREPARING THEM

This is a division of application Ser. No. 07/293,787, filed Jan. 5, 1989, now abandoned.

The present invention relates to resins which are useful for reducing the concentration of multivalent alkaline earth or transition metal ions in a solution containing such ions, to processes for preparing these resins and to the use of the resins. Such resins are commonly called ion exchange resins.

The present invention further relates to intermediates which are useful for preparing such ion exchange resins and to a process for preparing the intermediates.

It is well known in several areas of technology that cations of the alkaline earth metals and transition metals are desired to be removed from solutions due to their value or to the detrimental effects they can cause. For example, there are situations where these cations are desired to be removed from the streams, to the greatest extent possible, prior to the a) use of the liquid in chemical or separation processes,
b) consumption of the liquid or
c) release of the liquid into the environment.

It has long been known that it is possible to exchange detrimental ions in a stream with more acceptable ions and/or chelate ions to remove them from the streams. In this regard there have been many developments made over the years in this area of specialized polymeric resins and specialized functional groups which can be chemically bound to such resins to provide improved systems for the removal of various anions and cations. Notwithstanding this activity it remains quite unpredictable which functional groups or combinations of functional groups and polymeric resins will prove to be suitable for the removal of a particular ion or type of ion.

It remains desirable to provide new water insoluble ion exchange resins which are useful for reducing the concentration of alkaline earth or transition metal ions in solutions, particularly in aqueous solutions, containing such ions.

Furthermore, it is desirable to provide useful methods for preparing these water insoluble ion exchange resins.

One aspect of the present invention is resin having a polymeric matrix and functional groups of formula I $$-(CH)_m - \left[ \begin{array}{c} R^6 \; R^5 \\ | \; | \\ N-(CH)_r \\ | \\ R^4 \end{array} \right]_q - N-CH-SO_3R^3 \atop | \; | \atop R^1 \; R^2 \quad (I)$$

wherein:

$R^1$ is hydrogen, alkyl of 1 to 12 carbon atoms, cycloalkyl of 3 to 12 carbon atoms, $-(CH_2)_n-COOR^7$, $-(CH_2)_p-SO_3R^3$, $-(CH_2)_p-PO_3(R^7)_2$ or $$-CH-SO_3R^3, \atop | \atop R^2$$

$R^2$ independently in each occurence is hydrogen, alkyl of 1 to 12 carbon atoms, cycloalkyl of 3 to 12 carbon atoms or alkenyl of 2 to 12 carbon atoms, aryl, aralkyl, aralkenyl, $-(CH_2)_n-COOR^7$, $-(CH_2)_p-SO_3R^3$, $-(CH_2)_p-PO_3(R^7)_2$ or $-CH(SO_3R^3)_2$, $R^3$ independently in each occurence is hydrogen or a cation, $R^4$ independently in each occurence is hydrogen, alkyl, cycloalkyl or aryl, $R^5$ independently in each occurence is hydrogen, alkyl of 1 to 3 carbon atoms, hydroxy or $-COOR^7$, $R^6$ independently in each occurence is hydrogen, alkyl of 1 to 12 carbon atoms, cycloalkyl of 3 to 12 carbon atoms, $-(CH_2)_n-COOR^7$, $-(CH_2)_p-SO_3R3$ or $-(CH_2)_p-PO_3(R^7)_2$, $R^7$ independently in each occurence is hydrogen, a cation, alkyl of 1 to 12 carbon atoms or cycloalkyl of 3 to 12 carbon atoms, m is from 0 to 12,
n is from 1 to 12,
p is from 1 to 6,
r is from 1 to 6, and
q is on the average from 0 to 100.

The above-mentioned resin of the present invention does not have a substantial water solubility, has a polymeric matrix which is preferably cross-linked and is useful as ion exchange resin.

Another aspect of the present invention is a process for preparing the resin having a polymeric matrix and functional groups of formula I wherein a corresponding resin having functional groups of formula II $$-(CH)_m - \left[ \begin{array}{c} R^6 \; R^5 \\ | \; | \\ N-(CH)_r \\ | \\ R^4 \end{array} \right]_q - NHR^1 \quad (II)$$

wherein $R^1$, $R^4$, $R^5$, $R^6$, m, q, and r have the meanings given in formula I is reacted with a compound of formula III $$HC(O)R^2 \quad (III)$$

wherein $R^2$ has the meaning given in formula I and a compound of formula $(R^3)_2SO_3$ or $(R^3)_2S_2O_5$ wherein each $R^3$ independently is hydrogen or a cation.

In general, each $R^3$ independently is a cation in formula $(R^3)_2S_2O_5$.

Yet another aspect of the present invention is a process for preparing the resin having a polymeric matrix and functional groups of formula I by reacting a corresponding resin having functional groups of formula V $$-(CH)_m - \left[ \begin{array}{c} R^6 \; R^5 \\ | \; | \\ N-(CH)_r \\ | \\ R^4 \end{array} \right]_q - N-CH-OH \atop | \; | \atop R^1 \; R^2 \quad (V)$$

wherein $R^1$, $R^2$, $R^4$, $R^5$, $R^6$, m, q, and r have the meaning given in formula I with a compound of formula $(R^3)_2SO_3$ or $(R^3)_2S_2O_5$ wherein each $R^3$ independently is hydrogen or a cation.

In general, each $R^3$ independently is a cation in formula $(R^3)_2S_2O_5$.

By the expression a "corresponding resin" which is used for the starting materials in the above-mentioned processes of the present invention is meant a resin having different functional groups but the same polymeric matrix as the resin to be produced.

The resins having a polymeric matrix and functional groups of formula V are novel. Accordingly, they are another aspect of the present invention. They are useful intermediates for producing resins having functional groups of formula I.

Yet another aspect of the present invention is a process for preparing a resin having a polymeric matrix and functional groups of formula V by reacting a corresponding resin having functional groups of formula II

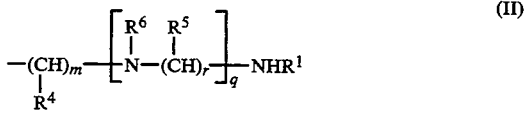

with a compound of formula III $$HC(O)R^2 \qquad (III).$$

Still another aspect of the present invention is the use of the resin having a polymeric matrix and functional groups of formula I wherein $R^1$, $R^2$, $R^4$, $R^5$, $R^6$, m, r and q have the meanings stated above and each $R^3$ independently is hydrogen or an alkali metal ion, preferably sodium, for reducing the concentration of alkaline earth or transition metal ions in a solution, preferably an aqueous solution, containing such ions.

Yet another aspect of the present invention is a method of reducing the concentration of alkaline earth or transition metal ions in a solution, preferably an aqueous solution, containing such ions by containing the solution with the resin having a polymeric matrix and functional groups of formula I wherein $R^1$, $R^2$, $R^4$, $R^5$, $R^6$, m, r and q have the meanings stated above and each $R^3$ independently is hydrogen or an alkali metal ion, preferably sodium.

It has been found that ion exchange resins having a polymeric matrix and the above mentioned functional groups of formula I are useful for adsorbing and removal of alkaline earth meal ions such as calcium, magnesium, strontium and barium ions and transition metal ions from solutions, preferably from aqueous solution such as water. Exemplary of transition metal ions are those of group VIII of the periodic table of elements, for example of iron, cobalt, nickel, of group IIIB such as lanthanum, of group IIB such as zinc, cadmium and mercury, of group IIIA such as aluminum, gallium, of group IVA such as lead and preferably of group IB such as copper and silver, or $UO_2^{2-}$. Most preferably, the resins of the present invention having a polymeric matrix and functional groups of formula I are used for adsorption and removal of copper ions such as $Cu^{2+}$ from an aqueous solution.

When $R^1$, $R^2$, $R^6$ and/or $R^7$ in the functional groups of formula I, II and V is alkyl it has 1 to 12, preferably 1 to 6, more preferably 1 to 3 carbon atoms. Preferably, $R^1$, $R^2$, $R^6$ and/or $R^7$ are hydrogen or alkyl of 1 to 3 carbon atoms.

Preferred meanings for $R^1$ are also $-(CH_2)_p-SO_3R^3$ or $-(CH_2)_p-PO_3(R^7)_2$, particularly $-CH_2-SO_3R^3$ or $-CH_2-PO_3(R^7)_2$.

When $R^1$, $R^2$, $R^6$ and/or $R^7$ is cycloalky it has 3 to 12, preferably 3 to 6 carbon atoms.

When $R^2$ is alkenyl it has 2 to 12, more preferably 2 to 6, most preferably 2 to 3 carbon atoms.

When $R^2$ is aryl, aralkyl or aralkenyl, such as phenyl or 2-phenyl-ethenyl, it preferably has 6 to 12 carbon atoms. Preferably, $R^2$ is $C_{1-3}$-alkyl or $C_{2-3}$-alkenyl, such as methyl or propenyl, or hydrogen.

When $R^4$ is aryl it preferably has 6 to 12 carbon atoms. The preferred aryl radical is phenyl. When $R^4$ is alkyl it generally has 1 to 12, preferably 1 to 6, more preferably 1 to 3 carbon atoms. When $R^4$ is cycloalkyl it preferably has 3 to 12, more preferably 3 to 6 carbon atoms.

Preferred cations contemplated by $R^3$ and $R^7$ in the foregoing formulae are alkali metal ions such as sodium or potassium, alkaline earth or transition metal ions such as those mentioned above, quaternary ammonium ions such as $NH_4+$ or tetraalkyl ammonium ions wherein the alkyl groups preferably have 1 to 12, more preferably 1 to 6, most preferably 1 to 4 carbon atoms, or the tetraphenylammonium ion.

Preferably, $R^4$, $R^5$ and/or $R^7$ are hydrogen;

m is from 0 to 12, preferably from 0 to 6, more preferably from 0 to 3, most preferably from 1 to 3;

n is from 1 to 12, preferably from 1 to 6, more preferably from 1 to 3;

p is from 1 to 6; preferably from 1 to 3, more preferably 1 or 2;

r is from 1 to 6; preferably from 1 to 3, more preferably 2;

q is from 0 to 100, preferably from 0 to 15, more preferably from 0 to 5.

The preferred meanings of $R^1$ to $R^7$, m, n, p, q and r are mainly dependent on the intended use of the water insoluble resins having a polymeric matrix and functional groups of formula I. For example, when using these water insoluble resins for removal of alkaline earth metal ions and transition metal ions from aqueous solutions, $R^3$ preferably has the meaning of the sodium ion.

The most preferred functional groups of formula I are those wherein $R^1$ is hydrogen, $-CH_2-SO_3R^3$ or $-CH_2-PO_3(R^7)_2$, $R^2$ and $R^4$ are hydrogen, $R^3$ and $R^7$ independently are hydrogen or a cation, preferably an alkali metal ion, most preferably the sodium ion, or a tetraalkylammonium ion, m is 1 and q is 0. The most preferred functional groups of formula V are those wherein $R^1$, $R^2$ and $R^4$ are hydrogen, m is 1 and q is 0.

The resins having a polymeric matrix and functional groups of formula I have a high sulfur content, in general of up to 9 weight percent, preferably between 6 and 9 weight percent, based on the total resin weight, a total sodium capacity of up to 18 g/l resin, preferably between 9 and 18 g/l resin and a total copper capacity of up to 50 g/l resin, preferably between 20 and 50 g/l resin.

Fundamental ion exchange technology is well known in the art and is for example described in the book "Ion exchange" F. Helfferich, McGraw-Hill Book Co., N.Y. 1962 and in "Ullmann's Enzyklopädie der Technischen Chemie", 4th Edition, Vol. 13, pages 279 ff. Various cross-linked polymers are useful as a matrix for the resins of the present invention. One known type of matrix is based on phenol/formaldehyde condensation polymers which are cross-linked with an aldehyde, a chlorinated hydrocarbon or an epoxy compound. The preferred matrixes are cross-linked polystyrene or poly-(alpha-methyl styrene) or cross-linked polymer beads of styrene or alpha-methyl styrene which is substituted at the benzene ring with $C_{1-6}$-alkyl, for example methyl, ethyl, tert. butyl, isopropyl, or a halogeno-$C_{1-6}$-alkyl, e.g. chloromethyl, or aminomethyl. The cross-linking agent is preferably an alkyl acrylate or a di- or polyvinyl compound such as trivinyl cyclohexane, ethylene glycol dimethacrylate or trimethylolpropane triacrylate, most preferably divinylbenzene. Divinylbenzene is typically copolymerized with the substituted or unsubstituted styrene.

The following description of the resins of the present invention relates to resins which have such a preferred cross-linked styrene-divinylbenzene copolymer matrix, although the scope of the present invention is not restricted thereto.

The resins of the present invention can have macroporous or gel-type (microporous) structure. The macroporous resins preferably have an average core diameter of more than 10 nm. The microporous resins preferably have an average core diameter of 0.5 to 2 nm.

The most preferred resins of the present invention are cross-linked spheroido gel-type copolymer beads which have a core/shell morphology. By the term "core/shell morphology" it is meant that the polymeric structure of the copolymer beads changes from the inside to the outside of the bead. Such changes in polymeric structure may be somewhat gradual yielding a bead having a gradient of polymeric structure along the radius. Alternatively, said changes in polymeric structure may be relatively abrupt as one moves along a radius of the bead outward from the center. The effect in any case is that these gel-type resin beads have a relatively distinct core having one polymeric structure and a relatively distinct shell having another polymeric structure. The core/shell morphology of the copolymer beads is detectable using known analytical techniques such as those mentioned in European Patent Application 0 101 943. The core/shell copolymer beads preferably have a shell containing a lower proportion of cross-linking monomers than the core. In this way, beads of this type will have a shell which is softer (less friable and more elastic) than the core of the bead. This permits the bead to distribute energy throughout its structure when subjected to external stresses and pressures while retaining its shape and integrity. It is believed that this improves the crush strength and resistance to osmotic shock of such core/shell copolymer beads. In addition to the difference in cross-link densities of the core and shell, the polymer in the shell can advantageously have a higher molecular weight than the polymers of the core. This also can impart mechanical strength to the bead and increase its resistance to osmotic shock. Accordingly, the breakage of the beads is reduced. The breakage of the ion exchange beads may be caused by mechanical or osmotic stresses, such as when the beads are subjected to sudden or repeated changes in electrolyte concentration. Such resins of the present invention having high crush strength and high resistance to osmotic shock are obtainable by using a corresponding resin having functional groups of formula II which exhibit a core/shell morphology as a starting material. The polymer beads useful for preparing the resins of the present invention are described in detail in European Patent Application 0 101 943.

The resins which have functional groups of formula I may be prepared from a corresponding resin having functional groups of formula II

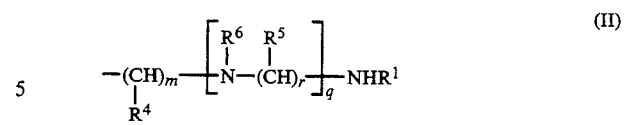

wherein $R^1$, $R^4$, $R^5$, $R^6$ and m, r and q have the meaning given in formula I.

The resins having functional groups of formula II are known in the art. They can be prepared by converting polymer beads having the above mentioned cross-linked matrix, for example poly(vinyl aromatic) copolymer beads, most preferably of styrene/divinylbenzene copolymers, to resins having the functional amino groups of formula II using techniques well known in the art. These techniques are for example described in "Ullmann's Enzyklopädie der Technischen Chemie", 4th Edition, Vol. 13, pages 301 ff. and in European Patent Application 0 101 943.

Resins having functional groups of formula II wherein m is zero can for example be prepared in a known way by the nitration of poly(vinyl aromatic) copolymer beads and reduction of the nitro groups which are bound to the aromatic ring to amino groups.

Preferably, resins are prepared which have functional groups of formula II wherein m is from 1 to 12, more preferably 1. When preparing these resins, in a first step the beads are advantageously haloalkylated, preferably halomethylated, most preferably chloromethylated. Methods for haloalkylating the cross-linked copolymers and the haloalkylating agents included in such methods are also well known in the art. The haloalkylating agent can be substituted, e.g. by aryl. Reference is made thereto for the purposes of this invention. Illustrative of such are U.S. Pat. Nos. 2,642,417; 2,960,480; 2,597,492; 2,597,493; 3,311,602 and 2,616,817, European Patent Application 0 087 934 and *Ion Exchange* by F. Helfferich, published in 1962 by McGraw-Hill Book Company, N.Y. and above mentioned "Ullmann's Enzyklopädie der Technischen Chemie".

Typically, the haloalkylation reaction involves swelling of the cross-linked polymer with a haloalkylating agent, preferably bromomethylmethyl ether, chloromethylmethyl ether or a mixture of formaldehyde and hydrochloric acid, most preferably chloromethylmethyl ether and then reacting the polymer and haloalkylating agent in the presence of a Friedel-Craft catalyst such as zinc chloride, iron chloride or aluminum chloride. Thereby, polymer beads having groups of formula—$(CHR^4)_m$—X wherein X is halogen, preferably chlorine, are prepared.

Generally, the resins having functional groups of formula II are prepared in a second step from the haloalkylated bead by contacting said bead with an amination agent such as ammonia, a primary amine or a secondary amine.

The amination agent preferably has the general formula IV

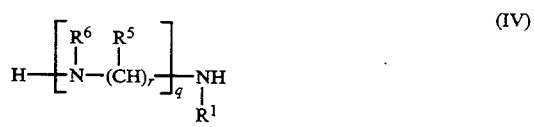

Representative primary and secondary amines include the methyl amine, ethyl amine, butyl amine, cyclohexyl amine, dimethyl amine and diethyl amine. Also diamines are useful such as alkylene diamines, preferably 1,3-diaminopropane, 1,4-diaminobutane or 1,6-diaminohexane. A preferred amination agent is a polyamine or oligoamine such as $$H-(NH-CH_2-CH_2)_q-NH_2.$$

A further preferred amination agent is hexamethylene tetramine (urotropin). After amination and hydrolysis resins having $-(CHR^4)_m-NH_2$ groups are produced.

Amination with a compound of formula IV generally comprises heating with reflux a mixture of the haloalkylated copolymer beads and at least a stoichiometric amount of the aminating agent to a temperature sufficient to react the aminating agent with the halogen atom. A reaction medium such as water, ethanol, methanol, methylene chloride, ethylene dichloride, dimethoxymethylene or combinations thereof is optionally, but advantageously employed. A complete amination is generally obtained within about 2 to 24 hours at reaction temperatures between 25° C. and about 150° C.

Resins having functional groups of formula II wherein $R^5$ and $R^6$ have a meaning other than hydrogen can be prepared by selecting those compounds of formula IV having the desired radicals $R^5$ and $R^6$ as an aminating agent or by converting after amination a resin having functional groups of formula II wherein $R^5$ and/or $R^6$ are hydrogen into a resin having functional groups of formula II wherein $R^5$ and/or $R^6$ have a meaning other than hydrogen in a known way. For example, the radicals alkyl, $(CH_2)_n-COOR^7$, $-(CH_2)_p-SO_3R^3$, $-(CH_2)_p-PO_3(R^7)_2$ can be introduced into a group of formula II by reacting a group of formula II wherein $R^6$ is hydrogen with a compound of formula X-alkyl, $X-(CH_2)_n-COOR^7$, $X-(CH_2)_p-SO_3R^3$ or $X-(CH_2)_p-PO_3(R^7)_2$ wherein X is halogen, preferably chlorine.

Resins having functional groups of formula II wherein $R^6$ is $-CH_2-SO_3R^3$, $-CH_2-COOR^7$ or $-(CH_2)-PO_3(R^7)_2$ can for example also be prepared by subjecting a functional group of formula II wherein $R^6$ is hydrogen to a sulfomethylation step described below, to a carboxymethylation or to a phosphomethylation step. The phosphomethylation can, for example, be carried out with formaldehyde or with a formaldehyde derivative stated below and with $H(R^7)_2PO_3$.

The described methods are particularly suitable for preparing resins having functional groups of formula II and having a poly(vinyl aromatic) copolymer matrix such as cross-linked polystyrene beads. Further methods of haloalkylation and amination of poly(vinyl aromatic) copolymer beads are described in WO-83/02947, WO 86/03988 and in U.S. Pat. Nos. 3,037,945, 4,002,564 and U.S. Pat. No. 4,442,231. Further methods of preparing resins having aminoalkyl groups are described in U.S. Pat. Nos. 3,882,053 and 3,989,650.

Methods for converting polymer beads other than poly(vinyl aromatic) beads to resins having functional groups of formula II are illustrated in Helfferich, supra, pages 48 to 58.

The resins having functional groups of formula I are prepared by reacting an above described corresponding resin having functional groups of formula II with a compound of formula III $$HC(O)R^2 \qquad (III)$$

and a compound of formula $(R^3)_2SO_3$ or $(R^3)_2S_2O_5$. Sodium sulphite, ammonium bisulphite, trimethylammonium sulphite, sodium bisulphite or sodium metabisulphite are preferred, sodium bisulphite and sodium metabisulphite being the most preferred reactants.

Preferably, $R^2$ is hydrogen, i.e. the compound of formula III is formaldehyde. Further useful aldehydes of formula III are acetaldehyde, crotonaldehyde, cinnamic aldehyde and $HC(O)-CH(SO_3R^3)_2$.

Sulphomethylation of monomeric amines with formaldehyde and sodium bisulphite is known from "Sulphonation and related reactions", by E. E. Gilbert, Interscience Publisher, 1965, pages 242 ff. The sulphonation is usually effected by mixing and heating the amine, aldehyde and sodium bisulphite in an aqueous solution for 3 hours in the range of 30° C. to 100° C.

From U.S. Pat. No. 2,761,834 sulphonated methylol acrylamide polymers are known. They are prepared using a polymerized acrylamide as a starting material. Polyacrylamide is reacted with formaldehyde and with sodium bisulphite simultaneously or in sequence. The reaction is carried out in an aqueous solution at a temperature between 30° C. and 100° C. The condensation between the formaldehyde and acrylamide is carried out under alkaline or acid conditions, preferably at a pH of 6 to 11 at a temperature between 20° C. and 100° C.

Sulphomethylation of polyacrylamide is also disclosed in *Ind. and Ing. Chem.* 48, pages 2132 to 2137, 1956.

Polyacrylamide is reacted with formaldehyde in an aqueous solution at a pH of about 10 and the produced methylol derivative is reacted without having been separated from the reaction mixture with sodium bisulphite or sodium sulphite at a pH of about 12. Also a simultaneous reaction between polyacrylamide, formaldehyde and sodium bisulphite at a pH of about 12 is suggested.

Unfortunately, the sulfomethylated products obtained according to these teachings contain rather high amounts of by-products. For example, in an alkaline reaction medium, sodium bisulfite reacts partially with the base whereby sodium sulfite is produced. When the amine, an aldehyde, such as formaldehyde, and sodium bisulfite are heated as suggested in the literature, sodium bisulfite and formaldehyde react to hydroxymethane sulfonic acid in an acidic reaction medium. Accordingly, the sulfomethylation step is sensitive to the pH of the reaction medium.

It has been found that the process of the present invention is useful for preparing the water insoluble resins having a high amount of the functional groups of formula I above. The process can be carried out by mixing a corresponding resin having functional groups of formula II with a compound of formula III and an above mentioned salt or derivative of sulphurous acid in one step. The reaction is preferably carried out in an aqueous reaction diluent. The preferred pH value is from 5 to 13, more preferably from 8 to 13. The reaction temperature is preferably from 20° C. to 100° C., most preferably from 40° C. to 80° C. The reaction is preferably carried out during 2 to 12 hours, most preferably during 3 to 8 hours. The compound of formula III and the above mentioned derivatives of sulphurous acid are preferably used in an amount of 1 to 10 mols, most preferably of 2 to 4 mols, based on the molar amount of functional groups of formula II in the resin which is used as a starting material in the sulphomethylation reaction. If $H_2SO_3$ is used in the reaction, it is preferably prepared in situ by passing gaseous SO₂ through an aqueous medium of a pH value of 4 to 7.

It was surprisingly found that higher conversion rates and ion exchange resins with a higher level of sulphonic acid groups are obtainable when the sulphoalkylation according to the process of the present invention is carried out in two separate steps. The best results are obtained if the intermediate product is isolated and preferably also purified.

In a first step a resin having functional groups of formula II as defined above is reacted with a compound of formula III to produce a resin having a polymeric matrix and functional groups of formula V

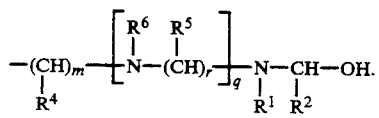

$$-(CH)_m\!-\!\!\left[\begin{array}{c}R^6\ R^5\\ |\ \ |\\ N\!-\!(CH)_r\\ |\\ R^4\end{array}\right]_q\!\!-\!N\!-\!CH\!-\!OH.\\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ |\ \ |\\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ R^1\ R^2$$  (V)

The resin having a polymeric matrix and functional groups of formula V and the mentioned method of preparing them are novel.

This step can be carried out at a pH value of 1 to 13, preferably 5 to 13, more preferably 8 to 13, and is preferably carried out in the above mentioned temperature range and above mentioned molar ratio. Of the compounds of formula III formaldehyde is preferred. Advantageously formaldehyde is used in the reaction as an aqueous formaldehyde solution, for example known as formalin. However, formaldehyde can also be prepared in the first reaction step in situ by treating trioxane, paraformaldehyde or a hexamethylene tetramine/water mixture with an inorganic acid such as HCl, H₂SO₄ or with an organic acid such as p-toluene sulfonic acid. The preparation of formaldehyde from trioxane or paraformaldehyde is described in "Ullmann's Enzyklopädie der Technischen Chemie", 4th Edition, Vol. 11, pages 697 and 698.

The intermediate product which has functional groups of formula V is insoluble in the reaction diluent such as water and can be easily separated from the reaction mixture, for example by filtration. Preferably it is also purified, for example by washing with water.

In a second step, the intermediate product having functional groups of formula V is reacted with a compound of formula (R³)₂SO₃ or (R³)₂S₂O₅, preferably in the same molar ratio and the same temperature range described above with respect to the one step process. The second step can be carried out at a pH value of 1 to 13. However, it is preferably carried out in an acidic reaction medium, more preferably at a pH of 2 to 5, most preferably at a pH of 3 to 4. Organic or inorganic acids can be used for adjusting the pH value in the second step. For example, HCl, H₂SO₄, HClO₄, H₃PO₄, acetic or p-toluene sulphonic acid are useful for adjusting the pH value. The acids are preferably used in about molar solutions. If H₂SO₃ is used in the reaction, it is preferably prepared in situ by passing gaseous SO₂ through an aqueous medium of a pH value of 4 to 7.

Resins having functional groups of formula I wherein R¹ has a meaning other than hydrogen can be prepared by selecting those resins having functional groups of formula II having the desired radical R¹ or by converting after sulfomethylation a resin having functional groups of formula I wherein R¹ is hydrogen into a resin having functional groups of formula I wherein R¹ has the desired meaning other than hydrogen in a known way. For example, the radicals alkyl, $-(CH_2)_n-COOR^7$, $-(CH_2)_p-SO_3R^3$, $-(CH_2)_p-PO_3(R^7)_2$ can be introduced into a group of formula I by reacting a group of formula I wherein R¹ is hydrogen with a compound of formula X-alkyl, $X-(CH_2)_n-COOR^7$, $X-(CH_2)_p-SO_3R^3$ or $X-(CH_2)_p-PO_3(R^7)_2$ wherein X is halogen, preferably chlorine.

A resin having functional groups of formula I wherein R¹ is $-CH_2-SO_3R^3$, $-CH_2-COOR^7$ or $-CH_2-PO_3(R^7)_2$ can for example also be prepared by subjecting a resin having functional groups of formula I wherein R¹ is hydrogen to a sulfomethylation step described above, to a carboxymethylation step or to a phosphomethylation step. The phosphomethylation can, for example, be carried out with formaldehyde or with a formaldehyde derivative stated above and with H(R⁷)₂PO₃.

Radical R¹ can be introduced into the functional groups of formula I before or subsequently to the sulfoalkylation of the resin having functional groups of formula II.

As will be illustrated by the following examples, the resins having functional groups of formula I have a high sulphur content. The sulphur content can be influenced by the way of carrying out the process of the present invention. The resins of the present invention which comprise a core/shell morphology exhibit excellent mechanical strength and resistance to osmotic shock. When testing these resins under osmotic shock similar to DIN method 45406 by treating the resins with 4 molar hydrochloric acid, then with water, then with 4 molar potassium hydroxide and again with water, typically more than 95 percent, in most cases even more than 99 percent of the bead sphericity is retained.

The resins of the present invention having functional groups of formula I, in particular those wherein each R³ is hydrogen or an alkali metal ion, are useful for reducing the concentration of alkaline earth or transition metal ions in a solution containing such ions, for example in water treatment and in precious metal recovery.

The resins having functional groups of formula I have amphoteric properties. Accordingly, they are useful for removing salts from solutions, for example in water treatment and purification, and in the processing, purification and separation of various amino acids and sugars.

The invention is further illustrated by the following examples which should not be construed to limit the scope of the invention. All parts and percentages are by weight unless otherwise mentioned.

The gel-type polyvinylbenzylamine resins employed in Examples 1 to 4, 7 to 10, 14 and 15 are prepared from commercially available gel-type styrene/DVB resin beads by chloromethylating the beads with chloromethyl ether, swelling the beads in methylal (formaldehyde dimethyl acetal) and aminating the resin with hexamethylenetetramine in a known way. The preparation of the styrene/DVB resin beads and of the polyvinylbenzylamine resins therefrom is for example described in "Ullmann's Enzyklopädie der Technischen Chemie", 4th Edition, Vol 13, pages 300 ff.).

The macroporous polyvinylbenzylamine resin employed in Example 5 is prepared analogously from commercially available macroporous styrene/DVB beads.

The polyvinylbenzylamine resin having a core/shell morphology employed in Example 6 is prepared analogously from commercially available styrene/DVB beads having a core/shell morphology according to the teaching in "Ullmann's Enzyklopädie der Technischen Chemie", 4th Edition, Vol. 13, pages 300 ff. and in European Patent Application 0 101 943.

The sulfur content of the resins having functional groups of formula I prepared according to the following Examples is determined by combusting the resin samples in oxygen and determining the sulfur content by ion chromatography.

The total copper wet volume capacity of the sodium form of these resins is determined by contacting the resin beads with a solution of 60 g of $CuSO_4$—$5H_2O$ and 120 ml of concentrated ammonium hydroxide diluted with water to 1 liter, washing the beads with water to remove excess copper and then with 2N sulphuric acid to remove the copper ions bound to the functional groups. The amount of copper removed from the beads with 2N sulphuric acid is determined using a potassium iodide/sodium thiosulphate oxidation/reduction titration.

The total copper wet volume capacity is expressed as milli equivalents per ml of wet resin. By drying a wet resin sample having a determined volume and determining its weight, the total copper dry weight capacity can be calculated.

The dynamic total calcium capacity for an ion exchange resin is determined using the sodium form of the resin at a pH of 10 to 12. The resin is transferred to a column equipped with a heating jacket. A chemically pretreated brine containing up to 2 milligrams calcium per liter of brine is passed through the resin at 60° C. and at a flow rate of 60 bed volumes of brine per hour. During the run the column effluent is monitored for calcium by colorimetry. This is done in order to determine when the resin bed is no longer removing the calcium to a sufficiently low level. This endpoint is set at 0.05 milligrams calcium per liter brine. With the ion exchange resins according to the invention the calcium concentration is below 0.02 milligrams calcium per liter brine for most of the cycle. When the endpoint of 0.05 milligrams calcium per liter brine is reached in the effluent, the regeneration of the resin is initiated by treating it with acid, deionized water and caustic. The solutions which are thus collected from the column are analyzed for calcium and the value for the resin dynamic capacity is calculated. The dynamic total calcium capacity is expressed as grams calcium per liter of resin.

EXAMPLE 1

A gel-type polyvinylbenzylamine resin is used which has a cross-linked styrene/divinylbenzene (DVB) matrix with a DVB content of 3 percent and which has a weak base capacity of 1.8 meq/ml.

50 ml of the resin is reacted with 150 ml of a 38 percent aqueous solution of $NaHSO_3$ and 80 g of paraformaldehyde. The solution is acidified by the addition of 20 ml of concentrated HCl and heated at 50° C. for 5 hours. The resin is separated by filtration and thoroughly washed with water.

The sulfur content is 0.8 percent.

EXAMPLE 2

100 ml of a 38 percent aqueous solution of formaldehyde and 200 ml of a 38 percent aqueous solution of $NaHSO_3$ are added to 100 ml of the polyvinylbenzylamine resin described in Example 1. The pH is adjusted to 13 with 25 percent aqueous NaOH and the mixture is heated at 50° C. for 6 hours. Additional aqueous NaOH is added dropwise to maintain the pH at 13. The total amount of 25 percent aqueous NaOH used is 180 ml.

The sulfur content is 3.8 percent.

EXAMPLE 3

50 ml of the polyvinylbenzylamine resin described in Example 1 and 100 ml of a 38 percent aqueous solution of formaldehyde are placed in a 500 ml three-necked glass vessel equipped with a stirrer and a reflux condenser. 25 ml of 30 percent aqueous HCl is added dropwise through a funnel to adjust the pH to 1. The mixture is heated at 50° C. for 1.5 hours. The resin is filtered off and thoroughly washed in water. The resin is placed into the vessel and 200 ml of a 37 percent aqueous solution of $NaHSO_3$ is added. The pH is adjusted to 3 using 15 ml of 1 molar aqueous HCl. The reaction mixture is heated at 50° C. for a further 6 hours. The resin is separated by filtration and dried.

The sulfur content is 6.1 percent.

EXAMPLE 4

21 ml of a 38 percent aqueous formaldehyde solution is added to 50 ml of the polyvinylbenzylamine resin described in Example 1. The pH is adjusted to 13 using 12 ml of 25 percent aqueous NaOH and the reaction mixture is heated at 70° C. for 1.5 hours. The resin is filtered off, washed in water and reacted with 50 ml of a 38 percent aqueous solution of $NaHSO_3$ at 70° C. for 5 hours. 18 ml of 25 percent aqueous NaOH is added to maintain the pH at 13.

The sulfur content is 6.9 percent.

Examples 1 to 4 illustrate that resins with a considerably higher level of sulfonic acid groups are obtained when the sulfomethylation is carried out in two separate steps and the intermediate is separated and purified.

EXAMPLE 5

A macroporous polyvinylbenzylamine resin is used which has a cross-linked styrene/DVB matrix with a DVB content of 6 percent and which has a weak base capacity of 1.2 meq/ml. 50 ml of the resin is reacted with 15 ml of a 37 percent aqueous solution of formaldehyde and 15 ml of 25 percent aqueous NaOH at 50° C. and a pH of 13 for 1.5 hours. The resin is isolated, washed with water and reacted with 35 ml of a 37 percent aqueous solution of $NaHSO_3$, 20 ml of 1 molar aqueous $H_2SO_4$ at 70° C. and a pH of 3 for a further 5 hours.

The sulfur content is 6.1 percent and the total copper capacity 0.8 meq/g.

EXAMPLE 6

A polyvinylbenzylamine resin is used which has a cross-linked styrene/DVB matrix. The resin has a core/shell morphology with a varying DVB content. The DVB content in the core is about 8 percent and in the shell about 2 percent. The weak base capacity of the resin is 1.4 meq/ml. 96 ml of the resin is reacted with 125 ml of a 38 percent aqueous solution of formaldehyde and 30 ml of 25 percent aqueous NaOH at 50° C. and a pH of 13 for 1.5 hours. The resin is filtered off, washed with water and placed into the reaction vessel. 400 ml of a 37 percent aqueous solution of $NaHSO_3$ and 35 ml of 1 molar aqueous $H_2SO_4$ is added and the reaction mixture is heated at 50° C. and a pH of 3 for a further 5 hours.

The sulfur content is 8.2 percent and the total copper capacity 1.3 meq/g.

EXAMPLE 7

50 ml of the polyvinylbenzylamine resin described in Example 1 is reacted with 21 ml of a 38 percent aqueous solution of formaldehyde at 50° C. for 1.5 hours. The pH is adjusted to 13 using 12 ml of 25 percent aqueous NaOH. The resin is filtered off, washed and placed into the reaction vessel. 50 ml of a 37 percent aqueous solution of $NaHSO_3$ and 15 ml of 1 molar aqueous $H_2SO_4$ are added and the mixture is heated at 50° C. for a further 5 hours. The resin is thoroughly washed with water and dried.

The sulfur content is 8.9 percent and the total copper capacity is 1.6 meq/g.

EXAMPLE 8

100 ml of the polyvinylbenzylamine resin described in Example 1 is stirred in a solution of 108 g of $Na_2SO_3$ in 225 ml of a 38 percent aqueous solution of formaldehyde. 30 ml of 25 percent aqueous NaOH is added and the reaction mixture is heated at 50° C. for 5 hours. The resin is separated by filtration and washed with water repeatedly.

The sulfur content is 2.4 percent.

EXAMPLE 9

50 ml of the polyvinylbenzylamine resin described in Example 1 is reacted with 100 ml of a 38 percent aqueous solution of formaldehyde and 30 ml of 25 percent aqueous NaOH at 50° C. and a pH of 13 for 1.5 hours. The resin is isolated, washed in water and placed into the reaction vessel. A saturated solution of 109 g of $Na_2SO_3$ in 240 ml of water and 15 ml of 1 molar aqueous $H_2SO_4$ are added and the mixture is heated at 50° C. and a pH of 3 for 5 hours.

The sulfur content is 3.1 percent.

EXAMPLE 10

50 ml of the polyvinylbenzylamine resin described in Example 1 is reacted with 21 ml of a 38 percent aqueous solution of formaldehyde and 15 ml of 25 percent aqueous NaOH at 50° C. for 1.5 hours. The resin is filtered off, washed with water and placed into the reaction vessel. A solution of 34 g of $Na_2S_2O_5$ in 60 ml of water and 20 ml of 25 percent aqueous NaOH are added and the mixture is heated at 50° C. for 5 hours.

The sulfur content is 7.2 percent.

EXAMPLE 11

50 ml of a gel-type chloromethylated resin which has a cross-linked styrene/DVB matrix with a DVB content of 1.8 percent and a wet volume capacity of 1.4 meq/ml is swollen with 75 ml of methylal (formaldehyde dimethylacetal) for 1 hour at 40° C. 200 ml of diethylenetriamine is added and heated for a further 5 hours at 60° C. After cooling to room temperature the resin is washed with diluted hydrogen chloride to remove the excess of the amine, then with water. The weak base capacity is 2.8 meq/ml.

60 ml of the produced polyvinylbenzylamine resin is added to 150 ml of a 37 percent aqueous solution of formaldehyde and 10 ml of 25 percent aqueous NaOH. The reaction mixture is heated to 50° C. for 3 hours and the resin is repeatedly washed with water. Then the resin is heated for a further 6 hours in 360 ml of a 38 to 40 percent aqueous solution of $NaHSO_3$ and 25 ml of 1 molar aqueous $H_2SO_4$. After the resin has been washed and dried, its total dry weight copper capacity is 1.2 meq/g.

EXAMPLE 12

150 ml of a macroporous chloromethylated resin which has a cross-linked styrene/DVB matrix with a DVB content of 6.4 percent and a wet volume capacity of 1.1 meq/ml is swollen in 120 ml of methylal for 1 hour at 40° C. 300 ml of tetraethylenepentamine is added and the mixture is heated for 5 hours at 60° C. After washing the resin with diluted hydrogen chloride and water the weak base capacity is 2.2 meq/ml.

100 ml of the produced polyvinylbenzylamine resin is reacted with 100 ml of a 37 percent aqueous solution of formaldehyde and 10 ml of 25 percent aqueous NaOH for 3 hours at 50° C. The resin is washed neutral with distilled water and reacted with 180 ml of a 38 to 40 percent aqueous solution of $NaHSO_3$ and 16 ml of 1 molar aqueous $H_2SO_4$ for 6 hours at 90° C. After washing with water the wet volume capacity of the resin is 0.5 meq/ml and the total dry weight copper capacity is 1.0 meq/g.

EXAMPLE 13

Example 11 is repeated, however, hexamethylenetetramine (urotropin) is used as the amination agent instead of diethylene triamine and the amination is carried out at 48° C. The weak base capacity of the produced polyvinylbenzylamine resin is 1.3 meq/ml. The sulfomethylation of this resin is carried out as described in Example 11. The total dry weight copper capacity is 1.3 meq/g.

EXAMPLE 14 a) Sulfomethylation 100 ml of the polyvinylbenzylamine resin described in Example 1 is reacted with 150 ml of a 38 percent aqueous solution of formaldehyde and 30 ml of 25 percent aqueous NaOH for 3 hours at 70° C. The resin is filtered off, washed with water and reacted with 400 ml of a 38 to 40 percent aqueous solution of $NaHSO_3$ and 30 ml of 1 molar aqueous $H_2SO_4$ for 6 hours at 70° C. The total copper wet volume capacity is 0.8 meq/ml. The total copper dry weight capacity is 1.6 meq/g.

b) Phosphomethylation 40 ml of the produced resin is further phosphomethylated with 35 g of $H_3PO_3$ dissolved in 55 ml of water. 13 g of paraformaldehyde and 11 ml of concentrated HCl are successively added to the reaction mixture and heated to 95° C. for 3.5 hours. After the resin has been washed with distilled water, the total copper wet volume capacity is 2.6 meq/ml. The total copper dry weight capacity is 5.0 meq/g. The dynamic total calcium capacity is 21.8 g calcium/1 resin.

EXAMPLE 15

120 ml of the sulfomethylated polyvinylbenzylamine resin produced according to Example 14a) is brought into its sodium form by treatment with 300 ml of 5 percent aqueous NaOH. The caustic is removed from the beads and the resin is added to the reactor. A solution of 104 g of chloroacetic acid in 180 ml of water is prepared. The solution is cooled in an ice-bath to less than 10° C. 45 g of 50 percent aqueous NaOH is slowly added keeping the temperature at less than 40° C. The solution is added to the reactor. An additional amount of 10 g of 50 percent aqueous NaOH is added and the flask is heated to 65 to 70° C. The reaction is held at this temperature for a total of 4 hours and then cooled to room temperature. The sodium chloroacetate solution is removed from the beads. The resin is washed two times with 500 ml of water stirring for 30 minutes. The produced resin is washed several times on a fritted glass filter. The total copper wet volume capacity is 1.3 meq/ml. The total copper dry weight capacity is 2.6 meq/g. The dynamic total calcium capacity is 5.8 g calcium/1 resin.

Examples 14 and 15 illustrate that resins which are sulfomethylated and phosphomethylated have a considerably higher copper and calcium capacity than resins which are only sulfomethylated or sulfomethylated-/carboxymethylated.

EXAMPLE 16

20 ml of the sulfomethylated polyvinylbenzylamine resin produced according to Example 11 is reacted with 17.5 g of $H_3PO_3$ dissolved in 28 ml of water. 6.9 g of paraformaldehyde and 6 ml of concentrated HCl are successively added. The reaction mixture is heated at 90° C. for 3.5 hours. After washing the resin with water, the total wet volume copper capacity is 0.7 meq/ml and the total dry weight copper capacity is 1.3 meq/g.

We claim:

1. A resin having
   (a) a polymeric matrix selected from the group consisting of cross-linked polystyrene, cross-linked poly-(alpha-methyl styrene), cross-linked polymers of styrene being substituted at the benzene ring with $C_{1-6}$-alkyl and cross-linked polymers of alpha-methyl styrene being substituted at the benzene ring with $C_{1-6}$-alkyl and
   (b) functional groups of formula V being bound to the aromatic rings of the polymeric matrix

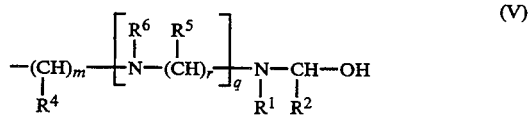

(V)

wherein:
$R^1$ is hydrogen, alkyl or 1 to 12 carbon atoms, cycloalkyl of 3 to 12 carbon atoms, —$(CH_2)_n$—$COOR^7$, —$(CH_2)_p$—$SO_3R^3$, —$(CH_2)_p$—$PO_3(R^7)_2$, or

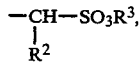

each $R^2$ independently is hydrogen, alkyl of 1 to 12 carbon atoms, cycloalkyl of 3 to 12 carbon atoms or alkenyl of 2 to 12 carbon atoms, aryl, aralkyl, aralkenyl, —$(CH_2)_n$—$COOR^7$, —$(CH_2)_p$—$SO_3R^3$, —$(CH_2)_p$—$PO_3(R^7)_2$ or —$CH(-SO_3R^3)_2$,
each $R^3$ independently is hydrogen or a cation,
each $R^4$ independently is hydrogen, alkyl, cycloalkyl or aryl,
each $R^5$ independently is hydrogen, alkyl of 1 to 3 carbon atoms, hydroxy or —$COOR^7$,
each $R^6$ independently is hydrogen, alkyl of 1 to 12 carbon atoms, cycloalkyl of 3 to 12 carbon atoms, —$(CH_2)_n$—$COOR^7$, —$(CH_2)_p$—$SO_3R^3$ or —$(CH_2)_p$—$PO_3(R^7)_2$,
each $R^7$ independently is hydrogen, a cation, alkyl of 1 to 12 carbon atoms or cycloalkyl of 3 to 12 carbon atoms, m is from 1 to 3,
n is from 1 to 12,
p is from 1 to 6,
r is from 1 to 6, and
q is 0.

2. The resin of claim 1 having a polymeric matrix of a cross-linked polystyrene.

3. The resin of claim 1 wherein the polymer is cross-linked with divinylbenzene.

4. The resin of claim 1 having functional groups of formula V wherein $R^1$, $R^2$ and $R^4$ are hydrogen, m is 1 and q is zero.

5. The resin of claim 1 having functional groups of formula V wherein $R^1$, $R^2$ and $R^4$ are hydrogen, m is 1 and q is zero.

6. A process for preparing a resin having
   (a) a polymeric matrix selected from the group consisting of cross-linked polystyrene, cross-linked poly-(alpha-methyl styrene), cross-linked polymers of styrene being substituted at the benzene ring with $C_{1-6}$-alkyl and cross-linked polymers of alpha-methyl styrene being substituted at the benzene ring with $C_{1-6}$-alkyl and
   (b) functional groups of formula 1 being bound to the aromatic rings of the polymeric matrix

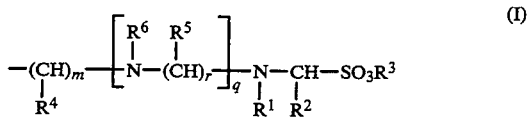

(I)

wherein:
$R^1$ is hydrogen, alkyl or 1 to 12 carbon atoms, cycloalkyl of 3 to 12 carbon atoms, —$(CH_2)_n$—$COOR^7$, —$(CH_2)_p$—$SO_3R^3$, —$(CH_2)_p$—$PO_3(R^7)_2$, or

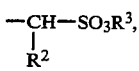

each $R^2$ independently is hydrogen, alkyl of 1 to 12 carbon atoms, cycloalkyl of 3 to 12 carbon atoms or alkenyl of 2 to 12 carbon atoms, aryl, aralkyl, aralkenyl, —$(CH_2)_n$—$COOR^7$, —$(CH_2)_p$—$SO_3R^3$, —$(CH_2)_p$—$PO_3(R^7)_2$ or —$CH(-SO_3R^3)_2$,
each $R^3$ independently is hydrogen or a cation,
each $R^4$ independently is hydrogen, alkyl, cycloalkyl or aryl,
each $R^5$ independently is hydrogen, alkyl of 1 to 3 carbon atoms, hydroxy or —$COOR^7$,
each $R^6$ independently is hydrogen, alkyl of 1 to 12 carbon atoms, cycloalkyl of 3 to 12 carbon atoms, —$(CH_2)_n$—$COOR^7$, —$(CH_2)_p$—$SO_3R^3$ or —$(CH_2)_p$—$PO_3(R^7)_2$,
each $R^7$ independently is hydrogen, a cation, alkyl of 1 to 12 carbon atoms or cycloalkyl of 3 to 12 carbon atoms,
m is from 1 to 12,
n is from 1 to 12,
p is from 1 to 6,
r is from 1 to 6, and
q is on the average from 0 to 100
by reacting a corresponding resin having functional groups of formula II

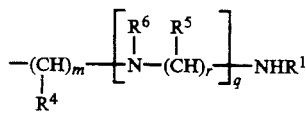
(II)

with a compound of formula III

HC(O)R²          (III)

and a compound of formula $(R^3)_2SO_3$ or $(R^3)_2S_2O_5$.

7. The process of claim 6 wherein the reaction is carried out in two steps by reacting in a first step a) a resin having functional groups of formula II with a compound of formula III to prepare the corresponding resin having functional groups of formula V

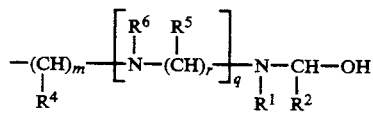
(V)

wherein $R^1$, $R^2$, $R^4$, $R^5$, $R^6$, $R^7$, m, n, p, r and q have the meaning stated in claim 11, and then reacting this intermediate resin in a second step b) with a compound of formula $(R^3)_2SO_3$ or $(R^3)_2S_2O_5$.

8. The process of claim 7 wherein step a) is carried out at a pH of 5 to 13.

9. The process of claim 7 wherein step b) is carried out under acidic conditions.

10. The process of claim 8 wherein step b) is carried out under acidic conditions.

11. The process of claim 10 wherein step b) is carried out at a pH of 3 to 5.

12. A process for preparing a resin having (a) a polymeric matrix selected from the group consisting of cross-linked polystyrene, cross-linked poly-(alpha-methyl styrene), cross-linked polymers of styrene being substituted at the benzene ring with $C_{1-6}$-alkyl and cross-linked polymers of alpha-methyl styrene being substituted at the benzene ring with $C_{1-6}$-alkyl and (b) functional groups of formula I being bound to the aromatic rings of the polymeric matrix wherein $R^1$, $R^2$, $R^3$ $R^4$, $R^5$, $R^6$, $R^7$, m, n, p, r and q have the meaning stated in claim 11, by reacting a corresponding resin having functional groups of formula V

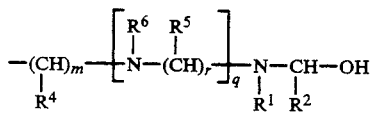
(V)

with a compound of formula $(R^3)_2SO_3$ or $(R^3)_2S_2O_5$.

13. A process for preparing the resin of clam 6 by reacting a corresponding resin having functional groups of formula II

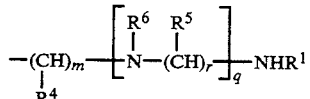
(II)

with a compound of formula III

HC(O)R²          (III).

14. A method of reducing the concentration of alkaline earth or transition metal ions in a solution containing said ions by contacting the solution with a resin produced according to claim 6 wherein each $R^3$ independently is hydrogen or an alkali metal ion and $R^1$, $R^2$, $R^4$, $R^5$, $R^6$, $R^7$, m, n, p, r and q have the meaning stated in claim 11.

15. The method of claim 14 wherein the solution is contacted with a resin produced according to claim 16 wherein each $R^3$ independently is hydrogen or an alkali metal ion.

16. The process of claim 6 for preparing the resin having a polymeric matrix of cross-linked polystyrene or poly(alpha-methyl styrene) or a cross-linked polymer of styrene or alpha-methyl styrene which is substituted with a $C_{1-6}$-alkyl group, the polymer being cross-linked with divinylbenzene and having functional groups of formula I wherein $R^1$ is hydrogen, $-CH_2-SO_3R^3$ or $-CH_2-PO_3(R^7)_2$, $R^2$ and $R^4$ are hydrogen, $R^3$ and $R^7$ independently are hydrogen or a cation, m is 1 and q is zero.

17. The process of claim 12 for preparing the resin having a polymeric matrix of cross-linked polystyrene or poly(alpha-methyl styrene) or a cross-linked polymer of styrene or alpha-methyl styrene which is substituted with a $C_{1-6}$-alkyl group, the polymer being cross-linked with divinylbenzene and having functional groups of formula I wherein $R^1$ is hydrogen, $-CH_2-SO_3R^2$ and $R^4$ are hydrogen, $R^3$ and $R^7$ independently are hydrogen or a cation, m is 1 and q is zero.

18. A method of reducing the concentration of alkaline earth or transition metal ions in a solution containing said ions by contacting the solution with a resin produced according to claim 12 wherein each $R^3$ independently is hydrogen or an alkali metal ion and $R^1$, $R^2$, $R^4$, $R^5$, $R^6$, $R^7$, m, n, p, r and q have the meaning stated in claim 11.

19. The method of claim 18 wherein the solution is contacted with a resin produced according to claim 22 wherein each $R^3$ independently is hydrogen or an alkali metal ion.

* * * * *